INVENTORS
WILLIAM T. BRENNEN
GEORGE H. SCHOONOVER
BY Robert S. Vermut
ATTORNEY

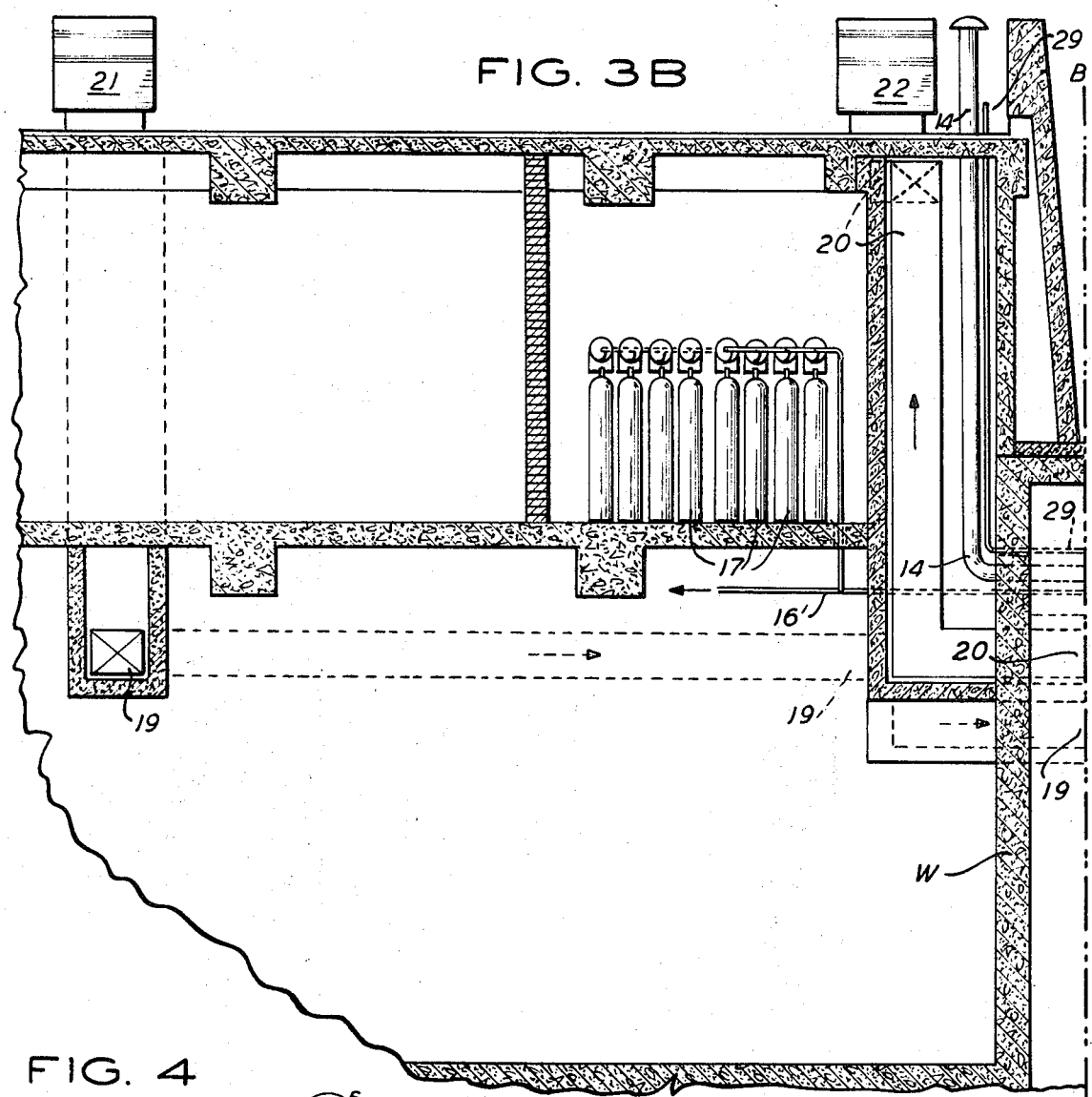
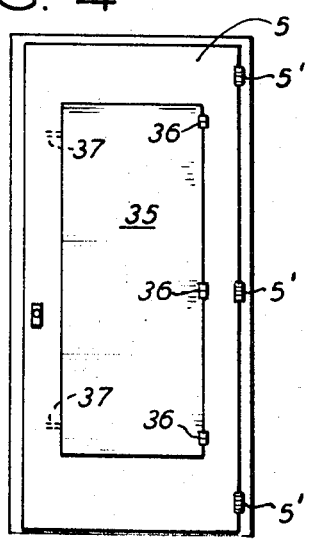
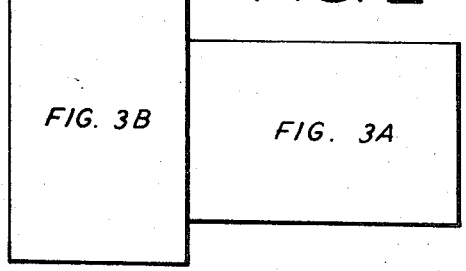

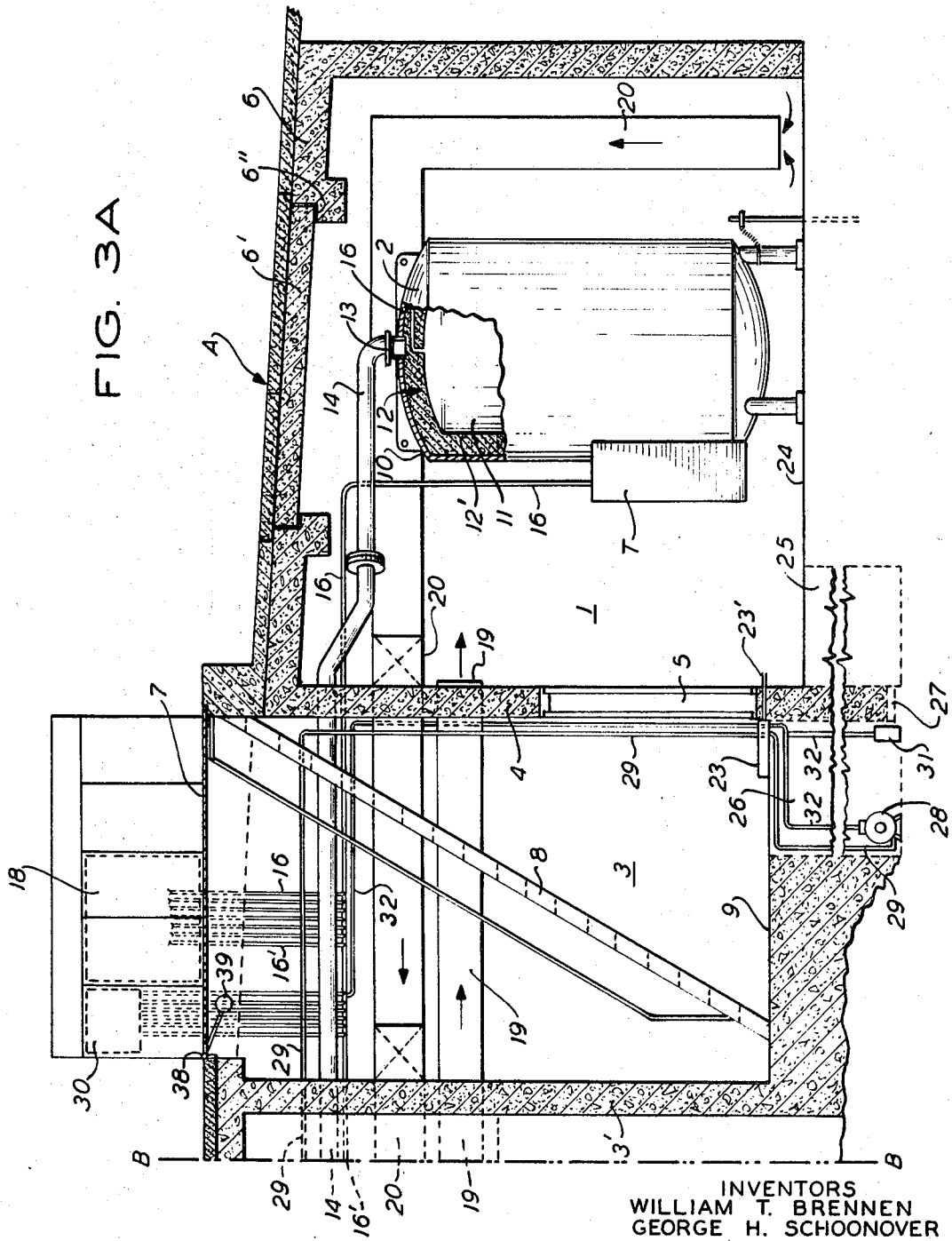

3,543,530
UNDERGROUND BULK STORAGE SYSTEM FOR CRYOGENIC LIQUID

William T. Brennen, New York, N.Y., and George H. Schoonover, Hillsdale, N.J., assignors to Air Reduction Company, Incorporated, New York, N.Y., a corporation of New York
Filed Aug. 14, 1968, Ser. No. 752,522
Int. Cl. F17c 1/00; F16l 5/00; B65d 51/16
U.S. Cl. 62—45      11 Claims

ABSTRACT OF THE DISCLOSURE

An underground bulk storage system for oxygen in liquid and vapor phases, comprising two adjoining bunker-type compartments, one having an insulated tank for storing liquid oxygen, and the other affording access to the oxygen tank compartment and having a sump in gravity-flow communication with the oxygen tank compartment for receiving condensate and escaped cold liquid oxygen therefrom, a condensate pump and temperature responsive means for shutting down the pump when escaped cold oxygen enters the sump, the tank compartment having a pressure-relief panel that opens into the access-compartment, and the latter having a pressure-relief access hatch that in turn opens to atmosphere, the tank compartment also having air ducts communicating with atmosphere above ground for fan-induced change of the tank compartment atmosphere.

BACKGROUND OF THE INVENTION

This invention relates to bulk storage systems for cryogenic liquids that are converted to vapor phase for practical uses, and in particular to a below-grade or underground bulk storage system for liquid oxygen.

Bulk storage of certain cryogenic fluids such as liquid oxygen in population centers is in general subject to civil regulations that concern, inter alia, the location and construction of the storage facility. That is, an oxygen-rich atmosphere due to accidental leak or massive escape of oxygen within a comparatively confined space can create a serious fire and/or explosion hazard. Accordingly, in most instances, a storage facility capable of meeting the oxygen requirements of a large hospital cannot be located within the hospital itself or within less than a prescribed distance therefrom. In such cases, the facility has heretofore been located above grade in the open, and spaced a certain distance from the hospital building.

Notwithstanding the simplicity and economy of such outdoor, above-grade bulk storage facilities, they have serious disadvantages, especially in congested urban centers, such as additional space requirements and exposure to vandalism. As to the former, confining property boundaries may even rule out such an installation. A known alternative in such instances has been inside use of small oxygen storage units, e.g., portable steel cylinders containing pressurized oxygen. As the smaller units require servicing at more frequent intervals during periods of large demand, the hospital accordingly lacks the stand-by and other practical advantages of a modern bulk oxygen storage system.

SUMMARY OF THE INVENTION

In accordance with the invention, the principal disadvantages of prior outdoor bulk storage systems for liquid oxygen and the like are avoided by locating an insulating tank containing liquid oxygen in bulk within an enclosed, below-grade, protecting bunker that has special features for promoting normal operation of the oxygen system and for isolating any malfunctions that concern the oxygen tank or the system in general; specifically, the system of the invention includes means for facilitating safe access to the bunker for inspection and maintenance, automatic pressure-relief means for preventing build-up of significant bunker pressures, forced-induction means for maintaining generally uniform ambient atmosphere and temperature in the bunker for normal liquid-to-vapor oxygen conversion and for venting the bunker, and sump means for collection of tank-ambient condensate for normal pumping to above grade, and also, in the event of a tank failure, for collection of escaped cold oxygen coincident with automatic shut-down of condensate pumping.

A principal object of the invention, therefore, is to provide an improved bulk storage system for cryogenic liquids, that is located below grade and that combines ready access with safety, efficiency of operation and protection of equipment.

A related object of the invention is a below-grade bulk oxygen storage facility that can be located directly beneath above-grade used areas, such as hospital entry driveways, etc., for optimum utilization of space.

Other objects, features and advantages will appear from the following description and claims taken with reference to the accompanying drawings.

BRIEF DESCRIPTION OF THE DRAWINGS

FIG. 2 is a position diagram for indicating the relationship in elevation, of FIGS. 3A and 3B, FIGS. 3A and 3B are elevational views in vertical section taken along the line 3A–3B of FIG. 1, and FIG. 4 is a detail view of the bunker access and pressure relief door shown in FIG. 3A.

Figure 1:
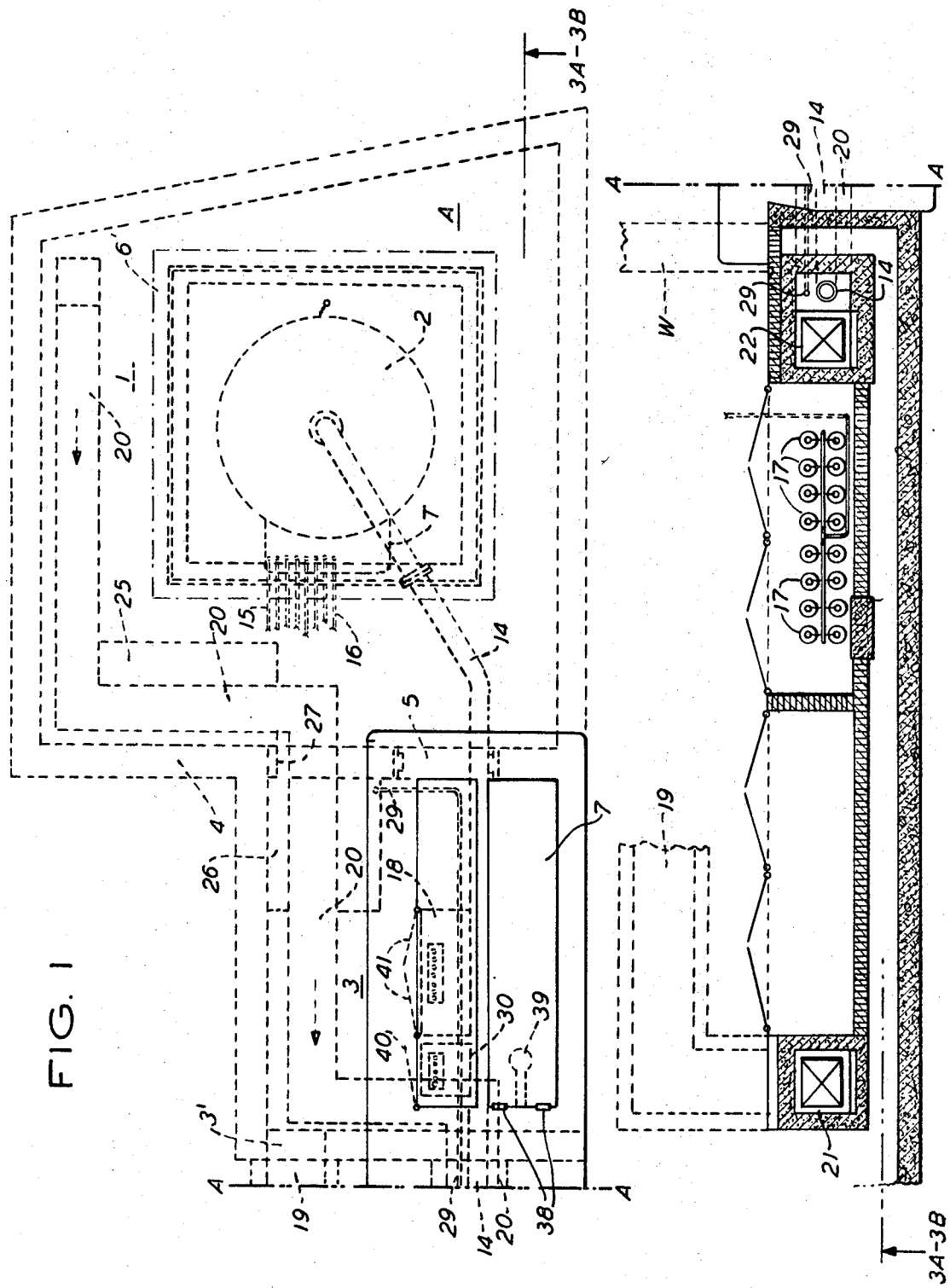
FIG. 1 is an above-grade extended-plan view, partly in horizontal section, indicating the below-grade location of a bulk storage facility for liquid oxygen embodying the invention.

The general underground arrangement of the bulk oxygen storage system is indicated by dotted lines in FIG. 1 and comprises essentially a main isolating and protecting bunker 1 containing a large insulated storage tank 2 for bulk liquid oxygen, and an access-compartment 3 adjoining and separated from the bunker by a common isolating wall 4. The isolating wall has a door 5, FIG. 3A, for service access to, and automatic pressure-venting of the bunker, as hereinafter described. For installation and possible replacement of the oxygen tank, the bunker over-head wall 6 has a heavy removable cover 6', with a sealing gasket 6" of lead sponge, FIGS. 1 and 3A, for making a gas-tight seal with the wall.

In the specific arrangement shown, the bunker and access-compartment have suitably strong walls of non-combustible material such as concrete where indicated, and are located directly beneath a used area A, namely, a paved entrance-driveway of a hospital at ground-floor level (herein called "grade"). The hospital building is completely apart from the nearest containing wall of the storage facility per se, referring to the access compartment rear wall 3', and the outer building wall W having portals (not shown) for ambulance entry from area A. Thus, the facility is actually isolated in the physical sense from the hospital for maximum safety.

The access compartment 3 has a pivoted overhead entry hatch 7, FIGS. 1 and 3A, that opens only outwardly, and that also functions for automatic pressure-relief as described below. A stairway 8 leads from the hatch to the floor 9 of the compartment, from which entry to the bunker is by way of the door 5, that in turn opens only towards the access compartment. The door 5 includes a pressure operated panel for automatically relieving excess bunker pressure.

The liquid oxygen storage tank 2 is of a conventional type and has an outer insulating jacket 10. FIG. 3A, that is spaced from the inner pressure-confining vessel 11 to form an annular space 12 containing an insulating powder 12' such as perlite. This space is normally evacuated to about 50 microns; however in the event of an oxygen leak from the inner vessel causing a limited pressure rise, the space 12 is automatically vented through a conventional vacuum lift-plate or pressure relief disc 13 to a vent pipe 14 that leads from the bunker, FIG. 3A, to atmosphere above grade. The inner vessel 11 is connected in usual manner to oxygen fill and service lines 15 and 16 respectively, for renewal supply of liquid oxygen to the vessel and for distribution of vaporized oxygen to a hospital oxygen main for individual piping to various stations in the hospital.

As indicated above, certain service lines 16, one of which is shown in FIG. 3A, are connected to the upper part of the vessel 11 containing the oxygen in vapor phase for piping vaporized oxygen to the hospital main at 16', FIG. 3A. Oxygen reserve cylinders 17, FIGS. 1 and 3B, are provided in case of any malfunctioning of the main storage system. The valve control equipment for the respective oxygen lines is located above grade in a control cabinet 18 that is conveniently mounted above the access compartment 3 and alongside the access hatch. A bunker terminal box T for the usual fill and service lines, safety valves, etc., associated with the pressure vessel 11 is mounted on the side of the oxygen tank. A detail description of the functioning of the various fill and service lines is unnecessary for present purposes, other than to mention that some of the lines (or conduits) are for electrical control of valves within the terminal box and accordingly connect with the electrical control cabinet.

As the liquid-to-vapor conversion of oxygen within the vessel 11 is due to normal heat-leak from the tank ambient atmosphere to the liquid oxygen, the bunker is provided with means for venting the cooled ambient and replacing it by amibent having a higher heat content. To this end, supply and exhaust ducts 19 and 20, respectively, extend through concrete tunnels and connect the bunker with atmosphere. Each duct has an air induction fan 21 and 22, FIG. 1, at the respective above-grade duct opening, the fan 21 forcing air through the duct 19 at atmospheric temperature into the bunker at its upper part, and the fan 22 drawing the cooler ambient, which includes any gas or vapor that may have accumulated in the bunker, through the duct 20 from near the bunker floor as shown by the flow direction arrows. Accodingly, the fan-equipped ducts perform a double function by maintaining fresh heat-containing ambient for the oxygen conversion process and removing unwanted vapors and gases. In the specific instance the duct fans are continuously operated at desired load.

The fan control consists of conventional electrical circuitry for speed regulation that may, if desired, include in known manner means for automatically adjusting fan load according to bunker and atmospheric conditions, as for example, in response to oxygen leak in the bunker or oxygen demand. For the former and other purposes, an oxygen detector or analyzer unit 23 is located in the access compartment at floor level and connected to the bunker by a probe 23' extending through the wall 4 for sampling the bunker ambient. The unit 23 is electrically connected by sealed cable to an above-grade control cabinet 30, FIGS. 1 and 3A. An alarm in the plant engineer's office is actuated by the detector if the bunker ambient becomes oxygen-rich; also if desired, one or both fans, may be responsive to oxygen detection through conventional circuitry for varying the fan load.

Incidental to changing the tank ambient and ventilating the bunker through the air duct system described above, is condensation within the bunker of atmospheric moisture from the cooled ambient. Although some of the condensate is carried off as vapor through the exhaust duct, a significant amount collects on the floor 24 of the bunker, from which it drains to a recessed receiving pit 25 that is located adjacent to the access compartment wall 4. Excess condensate is drained to the access compartment for removal. For normal removal of the condensate, and also for collecting and isolating cold oxygen in the event of accidental massive escape of liquid oxygen incident to rupture of the tank, the access compartment has a sump 26 opposite the bunker floor pit 25 that is connected thereto by a passage 27 extending beneath the wall 4 for receiving by gravity flow, bunker condensate and, if necessary, large amounts of cold oxygen. For this purpose, the sump also constitutes a hold-pit that is sufficiently deep for containing the entire liquid content of the oxygen tank.

During normal operation, condensate only from the bunker collects in the sump 26 from which it is removed by a conventional sump pump 28 that is connected to an exhaust pipe 29, FIG. 3A, extending to a suitable open drain location above grade. Because of the hazards involved in a confined oxygen-rich atmosphere, the sump cannot be drained into the usual mains. The sump pump is located for usual operation at the bottom of the sump, and is electrically operated in conventional manner through sealed conduits from the above-grade control cabinet 30, adjacent the oxygen lines control cabinet 18. Its operation is automatically controlled (as by the usual float-switch) for pumping only when sufficient condensate alone is in the sump; otherwise, in the event of accidental oxygen leak from the bunker tank, cold oxygen collected along with the condensate in the sump would cause freezing of the pump bearings and stalling of the pump motor with probable damage to the pump; also, a stalled pump motor within an oxygen-rich atmosphere can be a fire and explosion hazard.

To avoid the detrimental effect of extreme cold temperatures on the pump, a suitable temperature-sensing device 31 is located in the sump for shutting down the pump motor, concurrently with operating an alarm, in such event. The sensing device comprises, for example, a sealed unit including a standard thermostat set for interrupting the pump motor circuit at a predetermined low sump temperature, or a known form of temperature-sensitive resistance element operating through a current-responsive relay for interrupting the motor circuit. The sensing device is preferably connected as in the case of the pump motor, through moisture-sealed electrical conduits 32 to the above-grade electrical control cabinet 30 for isolation by remote control from the underground part of the facility.

Provisions for preventing significant rapid build-up of pressures within the bunker due to oxygen leak aside from lift plate 13, and within the access compartment due to pressure released from the bunker and/or excess liquid oxygen in the sump, comprise respectively the pressure-venting bunker access door 5 and the overhead hatch 7 of the access compartment. The bunker access door 5, opening from the bunker into the access compartment, FIGS. 3A and 4, is hinged at 5' for usual operation, and has a fire-proof panel or insert 35, that is in turn hinged at 36 within the door for opening only into the access compartment. The free edge of the panel may in a simple construction thereof have rabbitted edges for coacting with known spring biased bullet-type catches 37. The catch springs are adjusted for releasing the panel edge when the bunker-access compartment pressure differential exceeds 2 or 3 p.s.i., for example. At such pressures, the panel 35 swings open and the bunker is instantly pressure-vented into the access compartment that, in turn, functions somewhat as a pressure buffer between the bunker and above-grade facilities.

The access compartment is independently pressure-vented by the overhead hatch 7 which is hinged at 38 for upward movement only. The hatch has a counterbalance or the like, tending to close the hatch, indicated here as a simple counterweight 39. The hatch closing bias is overcome when the compartment pressure reaches about 3 p.s.i., thereby providing automatic pressure relief. The hatch in effect serves as a main emergency pressure relief means with the access compartment initially absorbing moderate pressures from the bunker.

For convenient access, the control cabinet 30 has an access door 40, FIG. 1, on the cabinet side opposite the hatch side; the doors 41 of the control cabinet 18 for the oxygen lines are similarly located. The cabinets are adequately constructed for protecting the enclosed equipment from weather, but are not pressure-confining, being open to atmosphere at the bottom.

Summarizing the stages of pressure-relief venting due to oxygen leak; where, for example, escaped oxygen has destroyed the vacuum and increased the pressure within the tank jacketed space 12, venting occurs in response to a small pressure, such as 0.5 p.s.i., at the vacuum lift-plate 13 and through vent pipe 14; where the leak is more serious and escaped oxygen penetrates the bunker and materially increases the pressure therein to about 3 p.s.i., the pressure-relief door panel 35 snaps open and vents the bunker to the access compartment; finally, if the oxygen leak is massive, and for any reason explosive pressures tend to build up within the access compartment, the pressure-responsive hatch 7 automatically opens and the compartment is effectively vented to atmosphere through the comparatively large opening area.

Accordingly, it is seen that excessive pressure build-up due to malfunction at any region within the facility, is effectively precluded; in practice, should a malfunction of this character occur, an early alarm is operated through oxygen detection in the bunker. Where the malfunction is serious, the hospital oxygen main can be transferred to the oxygen reserve cylinders 17 through standard oxygen line controls until the malfunction is corrected.

A basically new type of bulk-oxygen storage facility has resulted from the disclosed below-grade isolation and safety features of the invention. Although not conforming to conventional standards previously used, a below-grade bulk-oxygen storage facility as described herein has been approxed in meeting all essential safety requirements, and is being constructed for a large metropolitan hospital.

It is intended that all matter contained in the above description or shown in the accompanying drawings shall be considered illustrative and not in a limiting sense.

Having thus described our invention, what we claim is:

1. An underground bulk storage ssytem for cryogenic liquid comprising a below-grade bunker having therein a storage tank for cryogenic liquid, a below-grade enclosed compartment adjoining the bunker for access to the bunker, the access compartment having a normally closed overhead entrance opening thereto and a normally closed entrance opening to the bunker, a sump within the access compartment in communication with the bunker for receiving condensate and escaped cryogenic liquid therefrom, a pump for removing condensate from the sump to above grade, and ventilation means including ambient moving means for maintaining a generally uniform ambient temperature within the bunker.

2. The system set forth in claim 1 wherein a temperature sensing means is associated with said pump for causing shut-down of the pump when the sensing means ambient drops below a predetermined temperature.

3. The system set forth in claim 2 wherein the condensate, with absorbed gases, is pumped automatically from the sump to atmosphere, and the pump controls apart from the sensing means, are electrically operated and mounted above-grade, exteriorly of the access-compartment.

4. The system set forth in claim 2 wherein the sensing means is a thermostat and the pump and thermostat are positioned within the sump.

5. The system set forth in claim 2 wherein the bunker and access-compartment are separated by an isolation wall including the normally closed bunker entrance opening, the opening being normally biased closed by a pressure relief panel opening from the bunker into the access-compartment, the panel being subject to automatic opening when the bunker pressure exceeds a predetermined differential value with respect to the access-compartment pressure.

6. The system set forth in claim 5 wherein the access-compartment overhead entrance opening is normally closed by a hatch movable outwardly to atmosphere, the hatch being biased to closed position and subject to automatic opening when the access-compartment pressure exceeds a predetermined differential value with respect to atmospheric pressure.

7. The system set forth in claim 1 wherein said cyrogenic liquid is oxygen convertible from liquor to vapor phase, the liquid-to-vapor conversion of the oxygen depending on the tank ambient temperature in the bunker, and the ventilation means includes air ducts for fresh supply of atmospheric air tending to stabilize the tank ambient temperature, and for removal of condensate vapor and accumulated gases.

8. A system as specified in claim 1 wherein the sump capacity is at least equal to that of the storage tank.

9. The system set forth in claim 1 wherein said cryogenic liquid is oxygen, and an oxygen detector is positioned within the access-compartment and is connected through a probe to the bunker for sampling the bunker ambient oxygen content.

10. An underground bulk-oxgyen storage facility for providing a supply main with oxygen vapor comprising:
(a) a below-grade bunker having protective isolating wall including a top wall with a normally sealed servicing cover,
(b) an insulated pressure-confining storage tank for liquid oxygen within the bunker,
(c) air induction means connected to atmosphere above grade for changing the bunker ambient for stable liquid-to-vapor oxygen conversion and for bunker ventilation,
(d) a normally closed access compartment laterally adjoining the bunker and normally isolated therefrom by a common wall,
(e) the common wall including a door providing access to the bunker and having pressure-relief means for venting predetermined bunker pressure to the access compartment,
(f) a pressure-responsive access hatch at the top of the access compartment for venting predetermined compartment pressure to atmosphere above grade,
(g) a stairway leading to the compartment from the hatch,
(h) a sump in the access compartment for receiving from the bunker by gravity flow condensate and also, in the event of storage tank failure, escaped cold oxygen from the bunker, and
(i) means for pumping condensate from the sump to above grade.

11. The system set forth in claim 10 wherein a temperature sensing means is associated with said pump for causing shut-down of the pump when the sensing means ambient drops below a predetermined temperature.

References Cited

UNITED STATES PATENTS

| | | | |
|---|---|---|---|
| 2,433,896 | 1/1948 | Gay | 62—45 X |
| 3,326,011 | 6/1967 | Sparling | 62—260 |
| 3,393,519 | 7/1968 | Mitchell | 61—.5 |
| 3,407,606 | 10/1966 | Khan et al. | 62—45 X |

A. W. DAVIS, JR., Primary Examiner

U.S. Cl. X.R.

62—260; 137—357, 362; 220—9, 44, 88